US007754072B2

(12) United States Patent
Kelly et al.

(10) Patent No.: US 7,754,072 B2
(45) Date of Patent: Jul. 13, 2010

(54) WATER FEATURE CONSTRUCTION

(75) Inventors: David R. Kelly, St. Charles, IL (US); Edgar Beaulieu, Sugar Grove, IL (US)

(73) Assignee: Aquascape Designs, Inc., St. Charles, IL (US)

( * ) Notice: Subject to any disclaimer, the term of this patent is extended or adjusted under 35 U.S.C. 154(b) by 393 days.

(21) Appl. No.: 10/704,346

(22) Filed: Nov. 7, 2003

(65) Prior Publication Data

US 2005/0098488 A1 May 12, 2005

(51) Int. Cl.
*A01K 63/04* (2006.01)
*A01K 63/00* (2006.01)

(52) U.S. Cl. .................. 210/167.23; 210/151; 210/290; 210/416.1; 210/167.25; 239/16; 239/17; 239/20; 239/23

(58) Field of Classification Search .................. 239/16, 239/17, 23, 193; 210/151, 169, 290, 416.1, 210/747
See application file for complete search history.

(56) References Cited

U.S. PATENT DOCUMENTS

| | | | |
|---|---|---|---|
| 444,464 A | 1/1891 | Copeland | |
| 624,985 A | 5/1899 | Scott-Moncrieff | |
| 681,884 A | 9/1901 | Monjeau | |
| 2,153,789 A | 4/1939 | Carswell et al. | |
| 2,388,795 A | 11/1945 | Montgomery et al. | |
| 3,409,223 A * | 11/1968 | Gosh | 239/12 |
| 3,770,623 A | 11/1973 | Seidel | |
| 3,945,771 A | 3/1976 | Arakawa | |
| 4,209,388 A | 6/1980 | DeFraites | |
| 4,345,998 A | 8/1982 | Graffis et al. | |
| 4,364,830 A | 12/1982 | Roberts | |
| 4,562,963 A | 1/1986 | Butler | |
| 4,966,534 A * | 10/1990 | Hasslen, III | 417/423.3 |
| 4,997,568 A | 3/1991 | Vandervelde et al. | |
| 5,167,368 A * | 12/1992 | Nash | 239/17 |
| 5,174,897 A | 12/1992 | Wengrzynek | |
| 5,236,582 A * | 8/1993 | Huang | 210/167.25 |
| 5,314,619 A | 5/1994 | Runyon | |
| 5,318,701 A * | 6/1994 | Wang | 210/167.21 |

(Continued)

OTHER PUBLICATIONS

Advanced Construction Techniques p. 6&7, Aquascape Designs, Inc., Copyright 1998.

(Continued)

*Primary Examiner*—Dinh Q Nguyen
(74) *Attorney, Agent, or Firm*—Husch Blackwell Sanders Welsh & Katz

(57) ABSTRACT

A water feature for use in landscaping applications. A water issuing device, such as a waterfall construction is provided for receiving water and discharging water onto a gravel bed. The bed is positioned below the waterfall and forms a path or surface along which the water can flow in a stream-like manner and through which the water can percolate downwardly into the bed. A perforated and tubularly shaped collection module having a plurality of openings for receiving water percolating downwardly through the bed. A cylindrically-shaped and generally vertically oriented stack is coupled to the module for receiving water therefrom. A pump in the stack receives water from the water collection member and directs water to the waterfall construction. It is noted that water from the waterfall appears to disappear into the gravel and only a shallow stream is formed.

23 Claims, 3 Drawing Sheets

U.S. PATENT DOCUMENTS

| | | | | |
|---|---|---|---|---|
| 5,330,652 | A | 7/1994 | Goldman et al. | |
| 5,437,786 | A | 8/1995 | Horsley et al. | |
| 5,522,672 | A * | 6/1996 | Moore | 405/41 |
| 5,584,991 | A | 12/1996 | Wittstock et al. | |
| 5,746,921 | A * | 5/1998 | Gargas et al. | 210/617 |
| 5,893,975 | A | 4/1999 | Eipert | |
| 5,897,777 | A | 4/1999 | Zoeller et al. | |
| 5,921,711 | A | 7/1999 | Sipaila | |
| 5,951,866 | A | 9/1999 | Grove et al. | |
| 6,024,870 | A | 2/2000 | Thompson | |
| 6,149,991 | A * | 11/2000 | Okuda | 428/13 |
| 6,277,274 | B1 | 8/2001 | Coffman | |
| D449,310 | S | 10/2001 | Agresta et al. | |
| 6,423,218 | B1 | 7/2002 | Lindermeir et al. | |
| 6,428,691 | B1 | 8/2002 | Wofford | |
| 6,461,501 | B1 | 10/2002 | Porter | |
| 6,740,232 | B1 * | 5/2004 | Beaulieu | 210/151 |
| 7,114,668 | B2 | 10/2006 | Beaulieu | |

OTHER PUBLICATIONS

Creative Home Owner. Quick Guide. Ponds & Fountains. Copyright 1998, 1994 3 pages.

Simple Fountains—Dorcas Adkins. Copyright 1999. 8 pages.

The Master Book of the Water Garden. Copyright 1997. 5 pages.

Water Gardens in a Weekend, Peter Robinson. Copyright 2001. 6 pages.

Outdoor Water Features, Alan and Gill Bridgewater. Copyright 2001. 9 pages.

Water Garden Projects, Roger Sweetinburgh. Copyright 2002. 3 pages.

The Practical Rock & Water Garden, Peter Robinson. Copyright 2001, 2002. 6 pages.

Aquascaper, Winter 2000 (Full Magazine).

Advanced Construction Techniques p. 6 and 7, Aquascape Designs, Inc. (1998).

Ed Beaulieu, "The ABC's of bog construction: Mother Nature's mega filter!", pp. 19-21.

Response to Advisory Action mailed Jun. 19, 2008 as filed for U.S. Appl. No. 11/316,269 on Jul. 18, 2008 (3 pages).

Response to the Final Action of Apr. 1, 2008 as filed for U.S. Appl. No. 11/316,269 on Jun. 5, 2008 (3 pages).

Amendment and Response as filed for as filed for U.S. Appl. No. 11/316,269 on Dec. 28, 2007 (11 pages).

Declaration Traversing Rejection (37 C.F.R. 1.132) for U.S. Appl. No. 11/316,269 (2 pages).

Office of Research and Development, Cincinnati, Ohio, "Constructed Wetlands Treatment of Municipal Wastewaters" Sep. 1999 [in color] (16 pages).

TetraPress, "Low-Maintenance Water Gardens", [in color] 1996 (25 pages).

Replacement Information Disclosure Statement for Inter Partes Reexamination of U.S. Appl. No. 6,740,442 (4 pages).

Replacement Information Disclosure Statement for Inter Partes Reexamination of U.S. Appl. No. 7,114,668 (4 pages).

Letter from third party counsel dated Nov. 19, 2009.

* cited by examiner

WATER FEATURE CONSTRUCTION

FIELD OF THE DISCLOSURE

This disclosure relates to a water feature for landscaping applications and more particularly to a system where water issuing from a device flows to a bed where the water forms a surface stream and then flows downwardly within the bed so as to minimize or eliminate surface accumulation or pooling.

BACKGROUND

Water features have become increasingly popular as landscaping tools.

Many water features include a pool, pond, reservoir or other accumulator for surface water and may include at least one waterfall, fountain or the like from which water flows into a pond. The pond is usually stocked with fish and may include vegetation.

In general, people have found these water features to be relaxing and soothing due to the appearance and sound of flowing water. However, in some situations, for example in public settings, it is desirable to avoid pooling or the accumulation of surface water. By avoiding or minimizing surface accumulation, safety and liability concerns, if any, can be minimized.

SUMMARY

There is described herein a water feature for landscaping use which employs a device from which water issues or flows to a stream bed, a system for collecting water from the bed and a recirculating system. The water in the bed forms a shallow surface stream (usually less than a few inches), flows downwardly into the bed and does not pool so that surface accumulation is minimized. In other words, a pond or other surface accumulator is not present and safety and liability concerns are minimized.

The system includes a device which discharges water such as a waterfall, fountain or the like. With respect to a waterfall, it is positioned at an elevated level and discharges water to the bed, preferably of gravel, therebelow. The water flows on the bed so as to form a surface stream and flows into the bed so it does not accumulate on the surface of the bed. The water percolates downwardly into the bed to an elongated perforated, generally horizontally positioned, and tubularly-shaped collection module. An elongated vertically oriented and tubularly shaped vault or stack, which defines a sump at its lower end, is provided which is coupled at its lower end to the module, extends to a position adjacent the surface and provides a housing for a pump. Water from the bed enters the module and flows through the module to the vault and sump. The pump then delivers the water to the waterfall or other discharge device. The cycle is then repeated.

DETAILED DESCRIPTION OF THE PREFERRED EMBODIMENT

Figure 1:
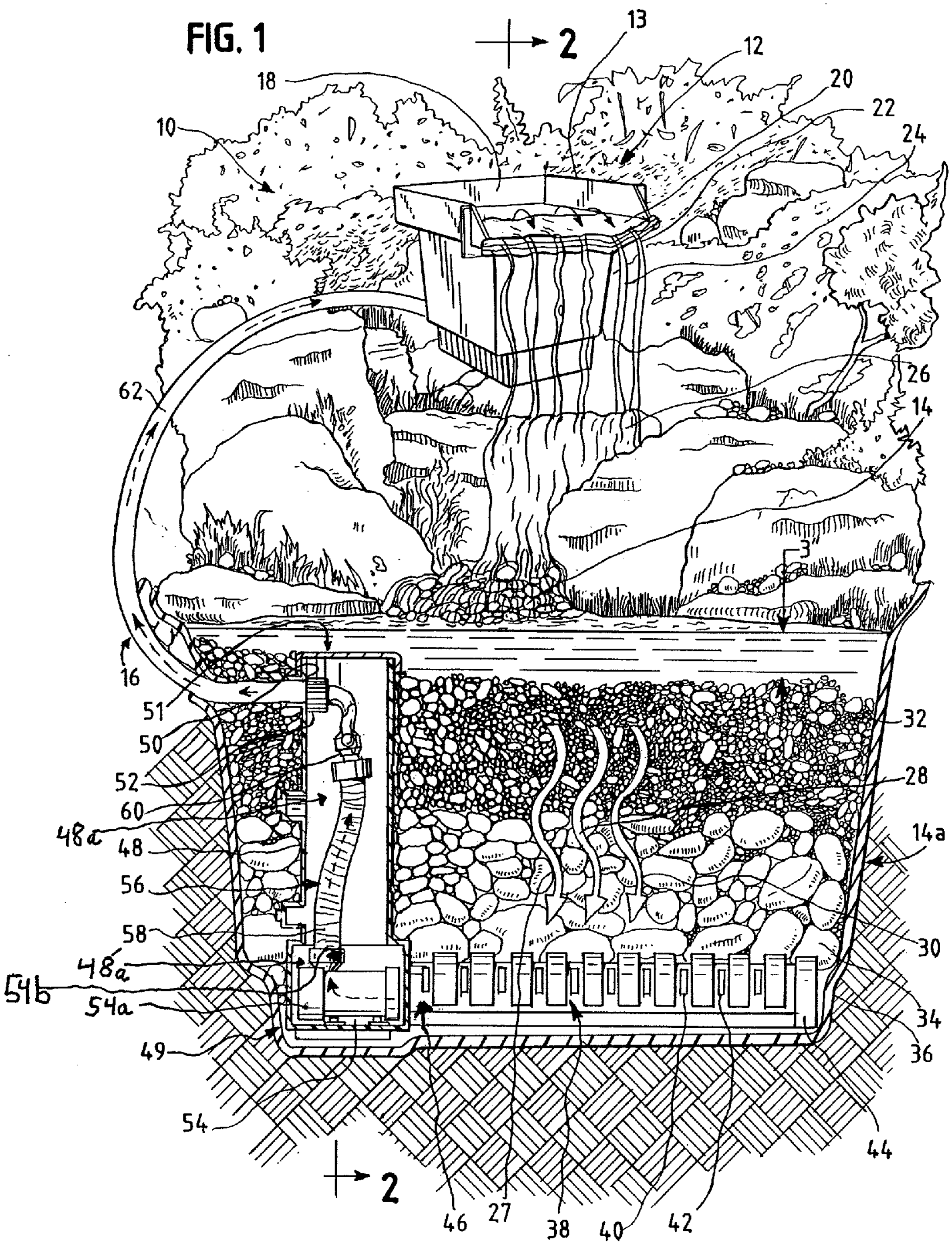
FIG. 1 is an elevational style view of the water feature showing a waterfall and stream and in section, the gravel bed, collection module, vault and pump.
Figure 3:
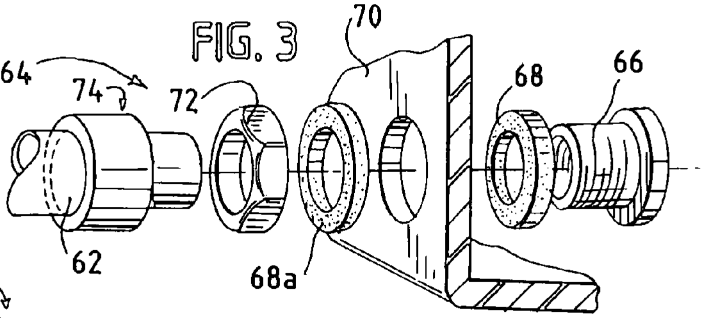
FIG. 3 is a perspective view showing in exploded fashion the waterfall inlet connection.

Referring now to FIG. 1, the water feature system 10 generally is shown. The system includes a water issuing device, such as a waterfall construction 12 generally, a gravel bed 14 generally and a water collection and recirculation system 16 generally.

The waterfall construction 12 includes a box-like member 13 which is open at the top 18 and forms a lip 20 from which water falls or is discharged. The waterfall construction includes an inlet 21 at the bottom of the waterfall box 13 so that water can be received in the waterfall construction. Water enters the box 13, flows upwardly through filters provided therein (not shown) and exits via the lip 20. In a landscape setting, the waterfall construction is blocked from view by surrounding soil, vegetation and/or rock formations so that only the downwardly flowing or cascading water is seen. It will be appreciated that other water-issuing devices, like a fountain can be used in place of the waterfall.

Streams of water such as 22 and 24 cascade downwardly from the waterfall construction 12 to the gravel bed 14. The gravel bed forms an elongated and sometimes meandering surface path or stream 26 from the waterfall construction.

The water forms a surface stream which is usually shallow and since it is on a gravel bed, the water percolates downwardly. Thus as shown in the figures and described herein water received from the waterfall construction percolates downwardly through the bed. The depth of the bed per se depends upon landscape considerations and on water collection considerations. Usually the bed is shallow near the waterfall construction and substantially deeper (e.g. 4 feet) in a position downstream from the waterfall construction 12. The stream of water 26 is seen at the base of the waterfall construction and flows on the bed surface. At the deeper portion 14*a* of the bed, the surface water (as shown by arrows such as 27, 28 and 30) appears to be lost or fall into the bed.

The bed includes gravel of different sizes. The gravel generally varies in size from small gravel 32 at the top to large gravel or stones 34 (sometimes referred to as cobbles) at the bottom. Brick or other aggregate materials can be used instead of gravel.

In other words, water flows from the waterfall along the bed surface, down into the bed and disappears into the bed. Thus, a child can play in the stream on the gravel, get his or her feet wet, experience flowing water and still hear a gurgling or flowing noise.

The bed is formed by an excavation which is lined by a water impervious material 36, such as a rubber, ethylene propylene diene monomer, concrete or the like. In fact, the liner is under the entire water feature so as to retain the water in a closed system. This includes the waterfall construction 12, the gravel bed 14 and the water collection and recirculation system 16.

The water collection and recirculation system 16 includes an elongated tubular and perforated water collection module 38 which is positioned below the bed surface (usually at the bed bottom) and at a generally horizontal attitude. The module includes water inlet apertures such as 40 and 42 by which water percolating through the gravel bed enters the module. It should be noted that large size gravel 34, sometimes referred to as cobble stones, is positioned adjacent the module thereby minimizing the risk of the apertures becoming clogged with the smaller gravel such as 32. The apertures, such as 40 and 42 are spaced along the length of the module.

One end 44 of the module is closed. The other end 45 of the module is open, forms a fluid coupling and is connected to an elongated, tubular, vertically oriented vault or stack 48. The stack has a sump 49 at its lower end. The sump is connected or coupled to the collection module 38. The top end 50 is closed with a cap 51 and positioned adjacent the surface of the bed. A connection opening 52 is provided in the side of the stack for use in the recirculation. In the sum 49 there is a pump 54 which receives water collected by the collection module 38 and discharges the collected water collected by the collection module 38 and discharges the collected water into a conduit 56 that directs collected water to the waterfall inlet 21. As can be seen in FIG. 1 the pump includes an external housing 54*a*. As also can be seen from FIG. 1, the structure 48 can be a container or enclosure.

The conduit 56 includes a discharge pipe 58 that extends from a fluid outlet 54*b* of the pump 54 and is positioned in the sump 49. As can be seen in FIG. 1, the stack 48 provides a a cavity, chamber or hollow 48*a*, the bottom 48*a'* of the cavity, chamber or hollow 48*a* is formed by sump 49. A check valve 60 is positioned at the upper end of the discharge pipe. The check valve 60 is also connected to tube 62 which extends from the check valve 60 through the opening 52 to the waterfall inlet 21. The tube 62 forms part of conduit 56. The check valve 60 prevents reverse flow from the waterfall.

Figure 2:
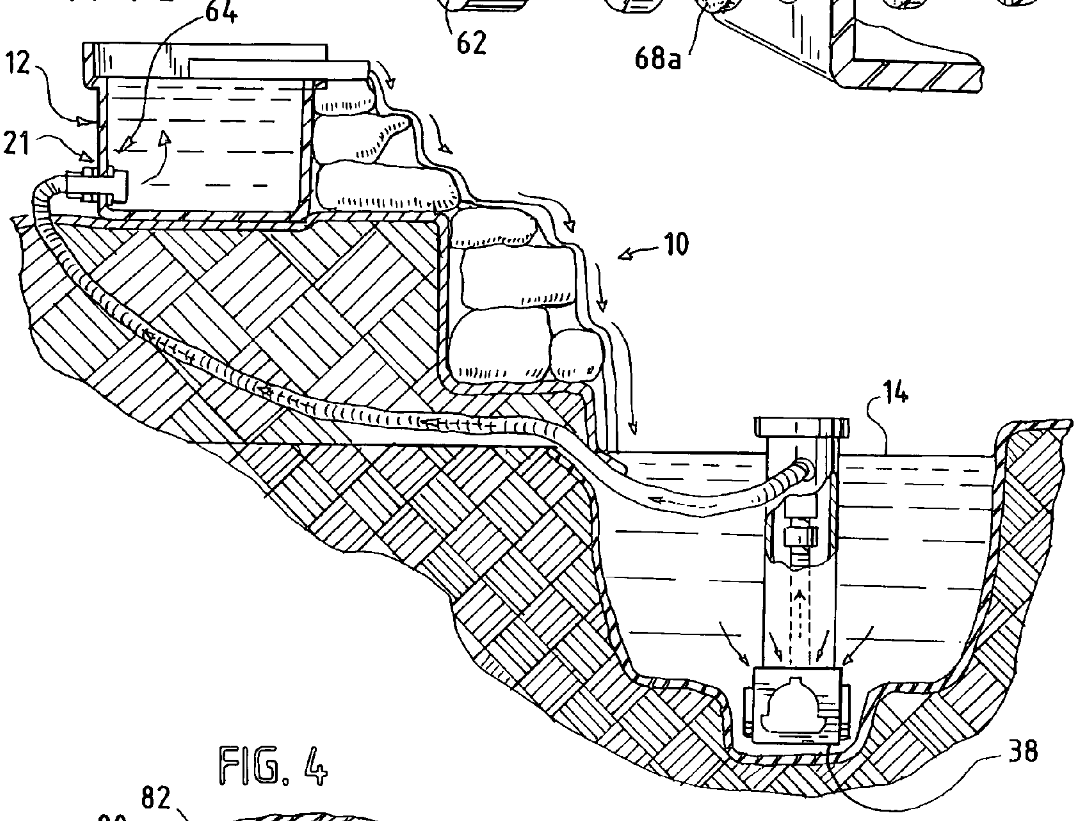
FIG. 2 is a sectional view taken along line 2-2 of FIG. 1 showing the waterfall, bed, module, vault and pump.

In FIG. 2, the water feature system 10 is seen in section and it is seen that appropriate rock, vegetation and other landscape features can be placed about the various water feature components to provide an appropriate setting. The waterfall construction 12 is positioned above the gravel bed 14 so as to provide for the flow of water from the waterfall to the bed in a cascading manner, down the bed surface like a stream and to the module 38. The collection module 38 is at the bottom of the gravel bed 14 so that water entering the gravel bed can percolate downwardly through the gravel to the module for recirculation.

The inlet to the waterfall system employs a bulkhead connection system 64. Generally, the connection system includes a threaded fitting 66 and a gasket 68 on the inside of the waterfall construction wall 70. A second gasket 68*a* is provided on the outside. A nut 72 secures the fitting 66 to the wall 70. The inside of the threaded fitting 66 is threaded (but in the reverse direction) and receives a threaded slip 74 which can be tightened. The slip has an opening to receive and seal to the conduit or tubing 62. The end of conduit 62 is slipped into the slip 74 and sealed thereto.

Figure 4:
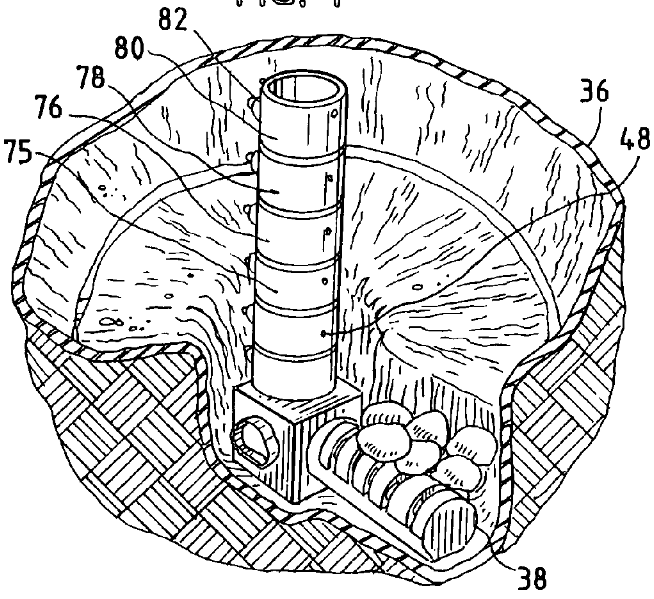
FIG. 4 is a perspective style view showing an excavation with a liner for the horizontal collection module and the vertical vault which has removable sections.

Referring now to FIG. 4, an excavation is shown for the liner, gravel bed (not shown), horizontal collection module 38 and vertical stack 48. It is seen that the stack 48 includes a plurality of tube-like sections 75, 76, 78 and 80. The sections can be removed or sections added so as to adjust the height of the stack and position the top of the stack at, below or just above the surface of the gravel bed. This positioning provides access to the interior of the stack 48 for cleaning or for pump removal. Usually these sections are marked with score lines and the sections can be cut from one another.

Each stack section includes a boss-like projection such as 82 (sometimes referred to as a hose tail) that can be cut open to provide for the connection or opening 52. Each section also includes a cap or extender engaging nibs or small projections 84 and 86 which are used to secure with an extender or cap to the main stack.

The collection module 38 although generally horizontal, is slightly sloped or tipped so that entering water flows to the sump 49.

Figure 5:
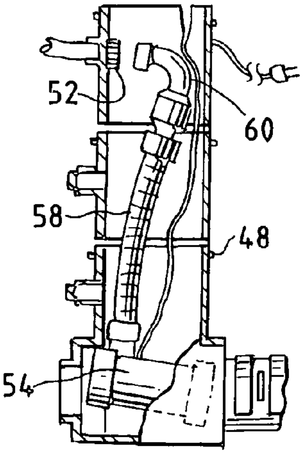
FIG. 5 is a vertical sectional view of the stack showing the pump in a position to be removed.

Referring now to FIG. 5, the pump 54, the discharge pipe 58 and check valve 60 can be removed from the stack or sump by disconnecting from the conduit 62 and then tipping or lifting.

Figure 6:
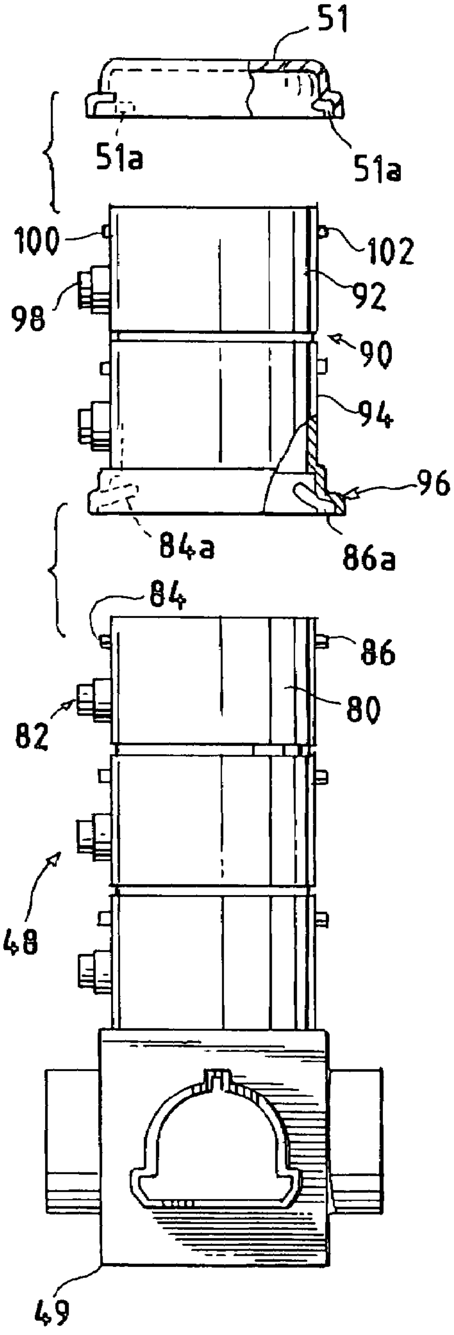
FIG. 6 is an elevational view showing a height extender member and a cap for the stack.

Referring now to FIG. 6, there is shown a stack 48 with sump 49. Also shown is an extender section 90 and cap 51. The stack includes three sections with the top section such as 80 including the hose tail 82 and nibs 84 and 86. The extender 90 is shown including two tubular extender sections 92 and 94 with the lower extender section including a collar 96 that is slightly larger in diameter than the stack sections such as 80. The collar 96, has threads 84*a* and 86*a*, can fit on the stack section 80, engage the nibs 84 and 86 and thus be screwed or otherwise secured and sealed to the section 80. It is seen that the extender sections also include a hose tail such as 98 and nibs such as 100 and 102. The cap 51 is formed similarly to the collar 96, has threads 51*a* that engage the nibs 100 and 102 and can be screwed down and sealed to the extender. It will be appreciated that the cap can also be secured to sections such as 80 as long as nibs such as 84 and 86 are provided.

Figure 7:
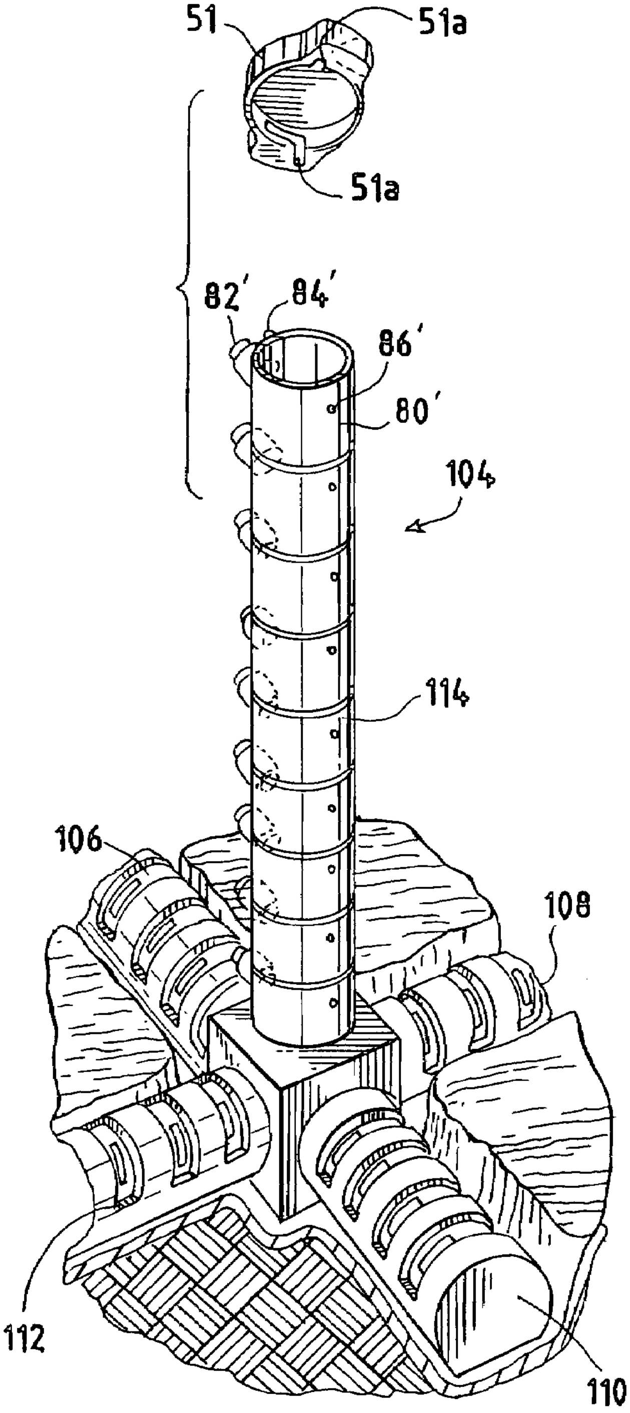
FIG. 7 is a perspective style view showing the stack and multiple collection modules coupled thereto.

Referring now to FIG. 7, there is shown a stack and collection module system 104 which is suitable for larger operations having a larger bed. Stack and module system includes a plurality of modules such as 106, 108, 110 and 112 which are connected to a vault or stack 114 having a sump 116 at the lower end thereof. This system is suitable for use in larger areas where it is desired to collect larger amounts of water so as to maintain the stream-like appearance and minimize accumulation.

Modifications and changes can be made to the foregoing without departing from the spirit and scope of the invention.

The invention claimed is:

1. A water feature for use in landscaping comprising:

(a) a water issuing construction for receiving water and discharging water;

(b) a bed positioned to receive water from the water issuing construction for forming a surface path along which water can flow, and through which water can percolate downwardly;

(c) an elongated perforated and tubularly-shaped water collection module horizontally positioned relative to the bed so as to receive downwardly percolating water;

(d) an elongated tubularly-shaped and generally vertically oriented stack coupled to said module so as to receive collected water from the module; and (e) a pump positioned in the stack and in fluid communication with the water-issuing construction for directing collected water to the water issuing construction.

2. A water feature as in claim 1 wherein said bed is formed of an aggregate material.

3. A water feature as in claim 2 wherein the aggregate material is gravel.

4. A water feature for use in landscaping comprising:

(a) a water issuing construction for receiving water and discharging water;

(b) a bed positioned to receive water from the water issuing construction for forming a surface path along which water can flow, and through which water can percolate downwardly;

(c) an elongated perforated and tubularly-shaped water collection module horizontally positioned relative to the bed so as to receive downwardly percolating water;

(d) an elongated tubularly-shaped and generally vertically oriented stack coupled to said module so as to receive collected water from the module; and (e) a pump positioned in the stack and in fluid communication with the water-issuing construction for directing collected water to the water issuing construction wherein said bed is formed of an aggregate material; wherein the aggregate material is gravel; and wherein said gravel is of different sizes with the largest size gravel positioned adjacent the collection module.

5. A water feature as in claim 1 wherein the water issuing construction is a waterfall-like construction.

6. A water feature as in claim 1 wherein the generally vertically positioned and tubularly shaped stack is connected at one end of the collection module, closed at the other end and positioned at the other end adjacent the surface of the bed and said pump is positioned in the stack.

7. A water feature as in claim 1 which further includes a conduit extending from the pump to the water issuing construction.

8. A water feature as in claim 7 which further includes a check valve operatively associated with said conduit and positioned between the pump and water issuing construction to prevent water flowing from the pump to the water issuing construction from flowing in the reverse direction.

9. A water feature for use in landscaping comprising:

(a) a water issuing construction for receiving water and discharging water;

(b) a bed positioned to receive water from the water issuing construction for forming a surface path along which water can flow, and through which water can percolate downwardly;

(c) an elongated perforated and tubularly-shaped water collection module horizontally positioned relative to the bed so as to receive downwardly percolating water;

(d) an elongated tubularly-shaped and generally vertically oriented stack coupled to said module so as to receive collected water from the module; and (e) a pump positioned in the stack and in fluid communication with the water issuing construction for directing collected water to the water issuing construction;

wherein said stack includes a plurality of removable and generally tubular sections for adjusting the vertical height of the stack.

10. A water feature as in claim 9 wherein there is a further provided a plurality of generally tubular extender sections for addition to the stack for adjusting the vertical height of the stack.

11. A water feature for use in landscaping comprising:

(a) a waterfall construction for receiving water and for discharging water in waterfall style, (b) a bed positioned below said waterfall for receiving water from the waterfall, for forming a surface path along which said water can flow, and through which water can percolate downwardly;

(c) an elongated perforated, tubularly-shaped and generally horizontally positioned collection module positioned relative to said bed for receiving water percolating downwardly through the bed;

(d) an elongated tubularly-shaped and generally vertically oriented stack coupled to the module;

(e) a pump positioned in the stack, and connected to the waterfall construction for receiving water from the collection module and directing water to the waterfall construction;

wherein the bed is formed of an aggregate material;

wherein the aggregate material is gravel;

wherein said gravel is of different sizes with the largest sized gravel positioned adjacent the collection module;

wherein the generally vertically-positioned and tubularly-shaped stack is coupled at one end to the collection member, closed at the other end and positioned at the other end adjacent the surface of the bed;

wherein a conduit extends from the pump toward the waterfall construction;

wherein a check valve operatively associated with said conduit and positioned between the pump and waterfall construction prevents water flowing from the pump to the waterfall from flowing in the reverse direction;

wherein said stack includes a plurality of removable and generally tubularly shaped sections for adjusting the vertical height of the stack; and wherein there is provided a plurality of generally tubular extender sections for addition to the stack for adjusting the vertical height of the stack.

12. A method of providing and operating a water feature used in landscaping comprising the steps of:

(a) providing:

1) a waterfall construction for receiving water and for discharging water in a waterfall style, 2) a bed positioned below said waterfall for receiving water from the waterfall, for forming a path along which said water can flow along the surface of the bed, and through which water can percolate downwardly, 3) a perforated, tubularly-shaped and generally horizontally-positioned collection module positioned relative to said bed for receiving water percolating downwardly through the bed, 4) a cylindrically-shaped and generally vertically oriented stack coupled to the module; and 5) a pump in the stack connected to the collection module for receiving water from the collection module and directing water to the waterfall construction b) causing water to exit said waterfall feature, flow onto the bed and form a surface stream, c) directing the water on the bed so as to percolate downwardly into the bed, d) collecting percolated water in the perforated tubular collection module, and e) directing water from the perforated module through the stack and to the waterfall construction.

13. A kit for the preparation of a water feature for landscaping comprising:

(a) a waterfall construction which includes a housing having an upper and a lower end with an inlet at the lower end and an outlet at the upper end;

(b) an elongated, perforated, tubular and horizontally positionable collection module for receiving water and directing water from the collection module;

(c) an elongated, perforated, tubularly-shaped and vertically positionable stack for connection to the collection module to receive water from the collection module;

(d) a pump constructed to be positioned in the stack for receiving water from the collection module and directing water to the inlet of the waterfall; and (e) a liner of flexible water impervious sheet material for lining an excavation and site where the water feature is to be located.

14. A kit for the preparation of a water feature for landscaping comprising:

(a) a waterfall construction which includes a housing having an upper and a lower end with an inlet at the lower end and an outlet at the upper end;

(b) an elongated, perforated, tubular and horizontally positionable collection module for receiving water and directing water from the collection module;

(c) an elongated, perforated, tubularly-shaped and vertically positionable stack for connection to the collection module to receive water from the collection module;

(d) a pump constructed to be positioned in the stack for receiving water from the collection module and directing water to the inlet of the waterfall; and (e) a liner of flexible water impervious sheet material for lining an excavation and site where the water feature is to be located, wherein the elongated and tubularly-shaped stack has a plurality of removable and generally tubularly-shaped sections.

15. A water collection device for a water feature for use in landscaping, said water collection device comprising:

(a) a structure selected from a group of structures consisting of a container, an enclosure and a vertically oriented tubular stack;

(b) a first opening into said structure;

(c) a second opening into said structure;

(d) a third opening into said structure, said third opening below said first and second opening;

(e) a removable closure;

(f) wherein when said structure is installed in said water feature, a pump having a pump housing is within said structure, a conduit extends from said second opening, and said conduit is coupled to a fluid outlet of said pump, a bed through which water can flow is positioned to receive water from a waterfall construction of said water feature, wherein water received from the waterfall construction percolates downwardly through the bed, and wherein when said structure is installed, said structure having said pump is in said bed and wherein when installed;

(g) said water having percolated downwardly is received by said pump through said third opening, and said removable closure closes said first opening off from said water.

16. A water collection device as in claim 15 wherein said bed includes a landscaping recess which is provided with a fluid impervious liner along its surface, which contains said water collection device, an aggregate fill-like material positioned on the impervious liner and about said water collection device and wherein the water flows downwardly by percolation.

17. A water collection device as in claim 16 wherein said collection device is adjacent the bottom of said bed.

18. The water collection device as in claim 15 wherein said structure comprises a bottom portion which forms a sump and wherein said pump is in said sump.

19. The water collection device of claim 15 wherein the stack is in sections.

20. The water collection device of claim 15 wherein the structure selected is a vertically oriented tubular stack.

21. A water feature comprising:

a waterfall construction for receiving and discharging water;

a bed, through which water can flow, positioned downstream of the waterfall construction, said bed positioned to receive water from the waterfall construction said bed minimizes accumulation of water on the surface thereof, wherein water received from the waterfall construction percolates downwardly through the bed;

a structure selected from a group of structures consisting of a container, an enclosure and a vertically oriented tubular stack, said structure positioned in said bed, said structure has a first opening closed by a removable closure, said structure has a second opening below said first opening;

a pump having a pump housing is in said structure;

a conduit extends from said pump toward the waterfall construction;

and said pump receives through said second opening, water from said waterfall construction which has percolated downwardly.

22. The water feature of claim 21 wherein the stack is in sections.

23. The water feature of claim 21 wherein the structure selected is a vertically oriented tubular stack.

* * * * *